(12) United States Patent
Jahn et al.

(10) Patent No.: US 8,284,423 B2
(45) Date of Patent: Oct. 9, 2012

(54) CUSTOMER-CONFIGURABLE PRINT WORKFLOW SYSTEM

(75) Inventors: Janeen E. Jahn, Lafayette, CO (US); Simon P. Jones, Warwick (GB); Linda S. Liebelt, Boulder, CO (US); Kyle P. Manning, Lafayette, CO (US); Dwight R. Palmer, Longmont, CO (US); Eric M. Sigler, Boulder, CO (US); Matthew M. Walli, Longmont, CO (US); Marc A. Willson, Leamington Spa (GB)

(73) Assignee: Ricoh Production Print Solutions LLC, Boulder, CO (US)

( * ) Notice: Subject to any disclaimer, the term of this patent is extended or adjusted under 35 U.S.C. 154(b) by 1084 days.

(21) Appl. No.: 11/279,052

(22) Filed: Apr. 7, 2006

(65) Prior Publication Data

US 2007/0236708 A1    Oct. 11, 2007

(51) Int. Cl.
*H04N 1/00* (2006.01)
(52) U.S. Cl. ............... 358/1.15; 358/1.16; 358/1.18; 399/82; 399/87; 399/361
(58) Field of Classification Search ............ 358/1.15, 358/1.16, 1.18; 399/82, 87, 361
See application file for complete search history.

(56) References Cited

U.S. PATENT DOCUMENTS

| | | | |
|---|---|---|---|
| 5,659,795 A | 8/1997 | Duvall et al. | |
| 6,078,982 A | 6/2000 | Du et al. | |
| 6,578,006 B1 * | 6/2003 | Saito et al. | 705/9 |
| 6,742,015 B1 | 5/2004 | Bowman-Amuah | |
| 6,970,844 B1 | 11/2005 | Bierenbaum | |
| 6,975,595 B2 | 12/2005 | Peterson | |
| 7,103,230 B1 * | 9/2006 | Jam et al. | 382/276 |
| 7,640,548 B1 * | 12/2009 | Yu et al. | 718/106 |
| 2004/0070785 A1 | 4/2004 | Ferlitsch | |
| 2004/0136028 A1 | 7/2004 | Rabb | |
| 2005/0076043 A1 | 4/2005 | Benedetti et al. | |
| 2005/0093881 A1 | 5/2005 | Okita et al. | |
| 2005/0225789 A1 | 10/2005 | Ferlitsch | |
| 2005/0243365 A1 * | 11/2005 | Noda | 358/1.15 |

OTHER PUBLICATIONS

Chao et al, "Business Process Modeling Based on Workflow Model Reuse," Services Systems and Services Management, 2005, Proceedings of ICSSSM '05, 2005 International Conference on Chongqing, China, Jun. 13-15, 2005, Jun. 13, 2005, pp. 951-954, IEEE, Piscataway, NJ, USA.
Madhusudan et al., "A Case-based Reasoning Framework for Workflow Model Management," Data&Knowledge Engineering, Jul. 2004, pp. 87-115, vol. 50, No. 1, Tucson, USA.

* cited by examiner

*Primary Examiner* — David K Moore
*Assistant Examiner* — Peter K Huntsinger
(74) *Attorney, Agent, or Firm* — Duft Bornsen & Fishman, LLP

(57) ABSTRACT

Methods, systems, and apparatus for flexible, configurable job workflow processing. Features and aspects hereof provide for generating workflow models from configurable templates. The workflow models may include one or more phases, each comprising one or more processes, each process comprising one or more steps. The Phases, processes, and steps may all be defined by configuring parameters of corresponding templates. Information defining the workflow models and all job information for jobs to be executed are entries in an integrated database such that creation and update of workflow model information and job information is performed as simple database queries and updates.

18 Claims, 8 Drawing Sheets

| Infoprint Workflow | | | | | | | | | |
|---|---|---|---|---|---|---|---|---|---|
| File Edit View Favorites Tools Help | | | | | | | | | |

Infoprint Workflow

| Main | Administration | Preferences | | | | | Help \| About \| Logout |

System Summary [View Log]

| | Preprocessing | Active | Manual | Error |
|---|---|---|---|---|
| Receive (0) | 0 | 0 | 0 | 0 |
| Prepare (0) | 0 | 0 | 0 | 0 |
| Print (17) | 0 | 3 | 11 | 3 |
| Complete (21) | 18 | 3 | 0 | 0 |
| All (38) | 18 | 6 | 11 | 3 |

Active Jobs in Print Phase

| Stop | Continue | Process Again... | Actions ▼ | | | | |
|---|---|---|---|---|---|---|---|
| ☐ | Number ˄ | Name ˄ | State ˄ | Priority ˄ | APrinter ˄ | TSheets ˄ | Class ˄ | Form ˄ |
| ☐ | 10000039 | LINEDATA | Unassign... | | | 5 K | | DRAGON... |
| ☐ | 10000040 | LINEDATA | Unassign... | | | 5 K | | DRAGON... |
| ☐ | 10000041 | LINEDATA | Unassign... | | | 5 K | | DRAGON... |

⏮ ▼ Page 1 of 1 ◀ ▶ Jump to Page: 1 ⏭ Total: 3 Display 15 ↻ Selected: 0

Printers (2) ▽

| Disable | Enable | Actions ▼ | |
|---|---|---|---|
| ☐ | Printer | Properties | |
| ☐ | 🖨 Worf - Ready | Class: Form: Destination: Customer: | |
| ☐ | 🖨 salida - Ready | Class: Form: Destination: Customer: | |

FIG. 7

CUSTOMER-CONFIGURABLE PRINT WORKFLOW SYSTEM

BACKGROUND OF THE INVENTION

1. Field of the Invention

The invention relates to the field of workflow systems and in particular to a workflow system design tool that enables significant customer configurability while allowing for definition of feature rich, complex workflow processes.

2. Statement of the Problem

A wide variety of systems entail processes that process information through a sequence of steps. In general, many such systems may be modeled and controlled as a workflow system wherein each step receives input, processes that input in some manner and forwards generated output to one or more next steps in the process. A complete process of such steps may be referred to as a process or a job. Workflow systems often allow for modeling of a complex sequence of steps including conditional evaluation for alternative paths or options through the entire workflow process.

Such workflow systems are frequently applied to a wide variety of workflows to model processes associated with a particular application area. In particular, workflow systems are frequently utilized to model workflows of data processing systems where input data is received by a step in the process, manipulated in various manners, and resulting data is applied to a next step in the process. Workflow systems may also be applied to model numerous other systems in a variety other application areas including, for example, process control systems such as may be common in manufacturing environments.

Workflow systems are sometimes created as customized programs designed and coded by system analysts and programmers designing and coding customized computer programs for a particular workflow processing application. Such a customized computer program may very closely model the underlying process but the development and maintenance costs are prohibitive in most environments. Other workflow modeling systems provide tools for more typical users to create new process models—e.g., without the need for skilled staff to create custom computer programs. These process modeling design tools aid an end user in creating a model for a new process and in maintaining the generated process models thus reducing or eliminating the need for skilled computer programmers and systems analysts. A number of workflow systems are available as commercial products that allow some degree of customization by a sophisticated end user. For example, IBM provides a product referred to as Infoprint Workflow ("IPW") for such workflow process modeling in the context of printing systems management. IPW is widely known to those of ordinary skill in the art and information regarding IPW is readily available at www.ibm.com.

Some present day commercial workflow modeling design tool products are simple to use and thus obviate the need for costly, trained computer programming professionals. But most such systems are so simplistic that they cannot model complex processes. Other commercially available workflow modeling design tools are so complex that they entail such design complexity that most users still require the services of a highly trained professional to perform required setup, configuration, and customization. Further, such systems are sufficiently complex that any maintenance to the workflow definitions may also require services of a costly, highly trained computer professional.

It is evident from the above discussion that a need exists for an improved workflow system that provides both a high degree of flexibility in modeling even complex workflow systems and also provides a simple, easy to use architecture that allows a less sophisticated end user to easily define and maintain workflow systems utilizing the workflow system design tools.

SUMMARY OF THE SOLUTION

The invention solves the above and other related problems with methods and associated systems and apparatus operable to flexibly configure a workflow system to execute jobs. Features and aspects hereof provide for generating workflow models from configurable templates. The workflow models may include one or more phases, each comprising one or more processes, each process comprising one or more steps. The phases, processes, and steps may all be defined by configuring parameters of corresponding templates. Information defining the workflow models and all job information for jobs to be executed are entries in an integrated database such that creation and update of workflow model information and job information is performed as simple database queries and updates.

One feature hereof provides a method for managing a workflow processing system. The method includes storing job information in a database. The job information relates to one or more jobs to be processed by the workflow processing system. The method also includes generating a workflow model to process one or more jobs relating to the job information in the database. The generated workflow model is stored in the database and the workflow model is generated from configurable templates. The method also includes processing one or more jobs using the workflow model in the database and using the job information in the database.

Another feature hereof provides a system for workflow processing. The system includes a database for storing one or more workflow models and for storing job information relating to jobs to be processed in accordance with a corresponding workflow model. The system also includes a computing node coupled to the database and adapted to execute jobs using the job information and the workflow model in the database. The computing node is further adapted to generate and modify workflow models stored in the database. The computing node is also adapted to generate the workflow models from templates.

Another feature hereof provides a method for workflow processing. The method includes configuring a workflow model based on configurable templates. The method also includes storing the configured workflow model in a database. Still further the method includes generating job information about a job wherein the job is associated with the generated workflow model and storing the job information in the database. The method then includes executing the job using the job information in the database and using the workflow model in the database.

The invention may include other exemplary embodiments described below.

DESCRIPTION OF THE DRAWINGS

The same reference number represents the same element on all drawings.

FIG. 7 is an exemplary display screen for presentation of status information relating to jobs and devices in a workflow system in accordance with features and aspects hereof.

DETAILED DESCRIPTION OF THE INVENTION

FIGS. 1 through 8 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
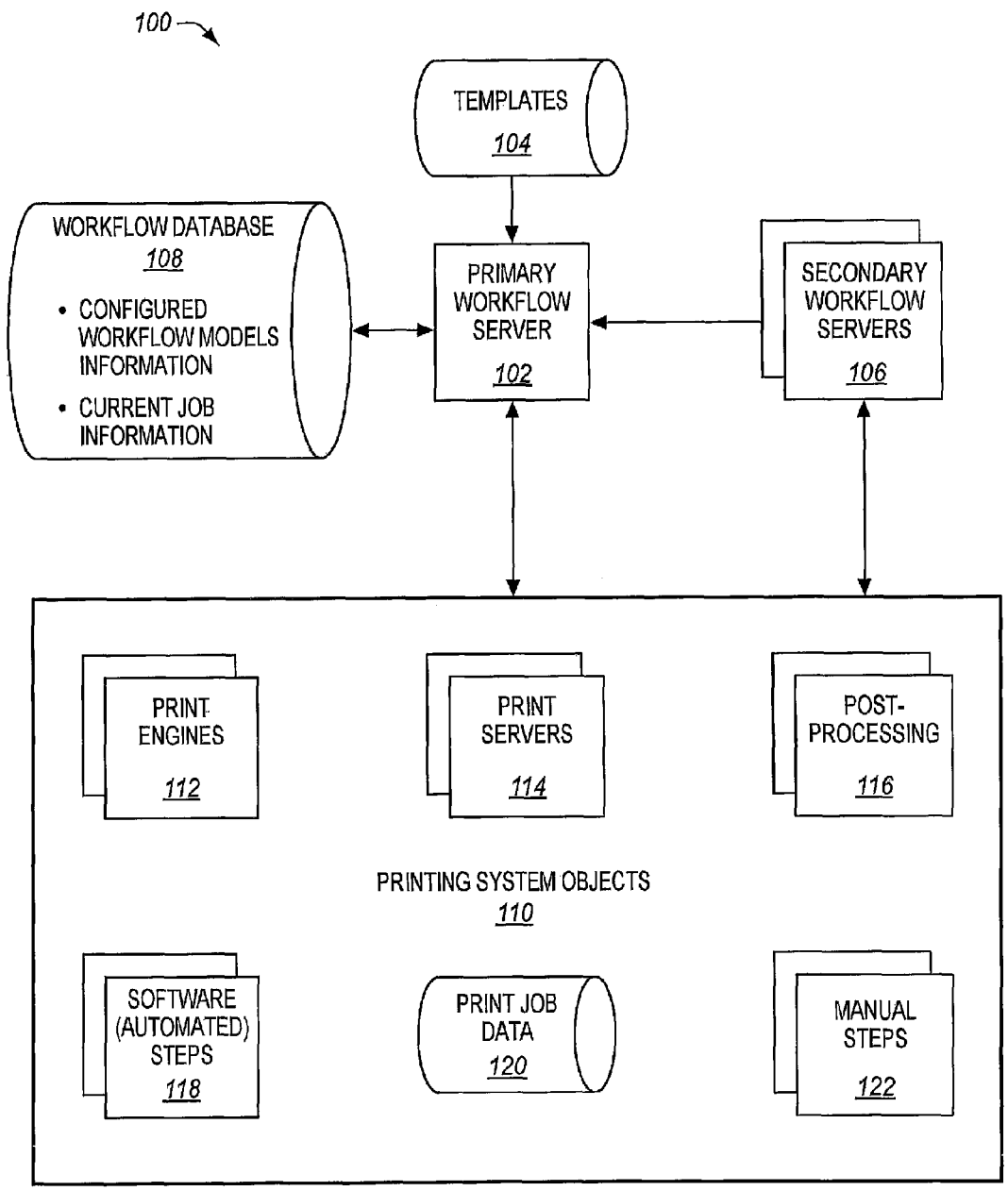
FIG. 1 is a block diagram of an exemplary workflow system in accordance with features and aspects hereof.

FIG. 1 is a block diagram of a system 100 providing flexible generation and configuration of workflow processing systems in accordance with features and aspects hereof. In particular, system 100 depicts a workflow processing system particularly as applied to a printing environment in which print jobs are performed or executed utilizing a variety of printing system objects 110 and in accordance with workflow models defined by elements of system 100. Primary workflow server 102 is a computing node used to generate workflow models in accordance with user input. A user may generally define a workflow model as comprising one or more phases, each phase including one or more processes, and each process comprising one or more steps that may in turn include conditional Boolean logic. Templates 104 are used by primary workflow server 102 to permit flexible configuration of a new workflow process by configuring attributes of standardized templates 104. In particular, templates 104 may include phase templates useful for defining new phases in a newly defined workflow model, process templates useful for defining each of the one or more processes within a newly configured phase, and step templates useful for configuring one or more steps in each newly defined process of each newly defined phase.

Flow is divided into phases, such as Receive or Prepare, and processes within those phases. A process is a sequence of steps that perform a logical set of actions on the jobs they process. Any particular job will flow through a particular set of phases, selecting a single set of processes in each phase. The ordered set of steps, grouped by the processes and phases that contain them, determine the workflow processing for a job.

Features and aspects hereof define how phases, processes, and states are represented in the system and how their interfaces are defined. Users of the workflow system, over time, build a set of reusable phases and processes that may be applicable to several offerings. For example, the Receive phase and its processes will likely be used in almost every application to receive an input job for processing. Exemplary embodiments described herein below discuss the phases, processes and steps needed for a printing enterprise application. The examples below are not intended to describe the complete set of functionality that can be supported, but rather suggest one concrete example of how the architecture can be applied in a specific case—print job workflows in printing enterprises.

Primary workflow server 102 stores the newly defined, configured workflow models as information in workflow database 108. In particular, the workflow models are stored in tables that define the relationships between the configured phases, configured processes, and configured steps as well as transition conditions for moving from step to step, from process to process, and from phase to phase in the workflow model. The configured phases, processes, and steps may be configured by appropriately setting attribute values and parameter values associated with the newly created entries in database 108. The templates 104 therefore provide a starting point for such configuration and the various attributes and parameters allow for significant flexibility in defining the ultimate workflow model for a particular type of job to be performed.

In addition to configured workflow model information, primary workflow server 102 also manages information relating to current jobs to be processed by system 100. A current job is associated with a particular configured workflow model to direct the processing of the job. A job type attribute may be used to associate a particular job with a particular workflow model—both stored in the workflow database 108. Primary workflow server 102 preferably includes a workflow engine processing element (not shown) that retrieves current job information for a particular job to be performed and retrieves information for the associated workflow model information and performs the phases, processes, and steps configured in the workflow model for the associated job.

One or more secondary workflow servers 106 may be provided to enhance the performance of the workflow processing system 100. Each secondary workflow server 106 may also include a workflow processing engine (not shown) to provide additional computational power for performing other workflows associated with other jobs or portions of a particular workflow for a particular job. Such distribution may include distributing different jobs to be performed to the various servers (and their associated workflow processing engines) or may include distributing individual steps, processes, or phases from a single workflow over the multiple servers 102 and 106.

To simplify coordination of such multiple servers accessing the common, shared workflow database 108, secondary workflow servers 106 may access workflow database 108 only through coordinated processing with primary workflow server 102. Those of ordinary skill in the art will readily recognize other mutual exclusion techniques and processing coordination approaches to help assure coordinated processing of one or more secondary workflow servers 106 and processing of primary workflow server 102 in concurrently accessing workflow database 108. In addition, the workflow database 108, per se, may be distributed using network storage architectures and other distributed storage and processing paradigms. Such distribution versus centralization techniques are well known matters of design choice for those of ordinary skill in the art.

As thus far described, workflow system 100 may be applied to processing of any jobs that may be described by a workflow model comprising one or more phases, each phase comprising one or more processes, each process comprising one or more steps. By way of example, system 100 includes printing system objects 110 accessed by the primary workflow server 102 and the optional additional secondary workflow servers 106 to perform workflow job processing for print jobs. The workflow servers (102 and 106) may access any of the various print system objects 110 as required to execute a particular print job in accordance with an associated workflow model. Print system objects 110 may include any number of print objects useful to execute print jobs including, for example, print engines 112, print servers 114, post processing elements 116, software or automated steps 118, and manual steps 122. In addition, print system objects 110 may include the actual print job data as it is manipulated and transformed through the workflow job processing. Print job data 120 therefore represents data associated with one or more print jobs in raw form as well as various translations and transformations thereof. For example, print job data 120 may be implemented as a print spool feature for spooling raw print data as well as rasterized or ripped print data as generally known to those of ordinary skill in the art. Other print related data may be stored with the print spool data. For example, control files describing configuration and operation of post-processing equipment may be specified in files associated with print data 120.

As applied to such print job workflow management, system 100 may, in accordance with the phases, processes, and steps of a corresponding workflow model, access the print engines, print servers, post processing element, software/automated and manual steps all for purposes of processing print job data 120 to effectuate eventual printing of the data on appropriate printable medium.

Those of ordinary skill in the art will readily recognize that workflow processing system 100 may be adapted to couple to any application specific objects associated with workflow processing of an associated job. Thus, print system printing system objects 110 are merely intended as one exemplary application of structures and methods of system 100. Further details of the exemplary application of system 100 to a printing environment such as shown in FIG. 1 are discussed further herein below.

Figure 2:
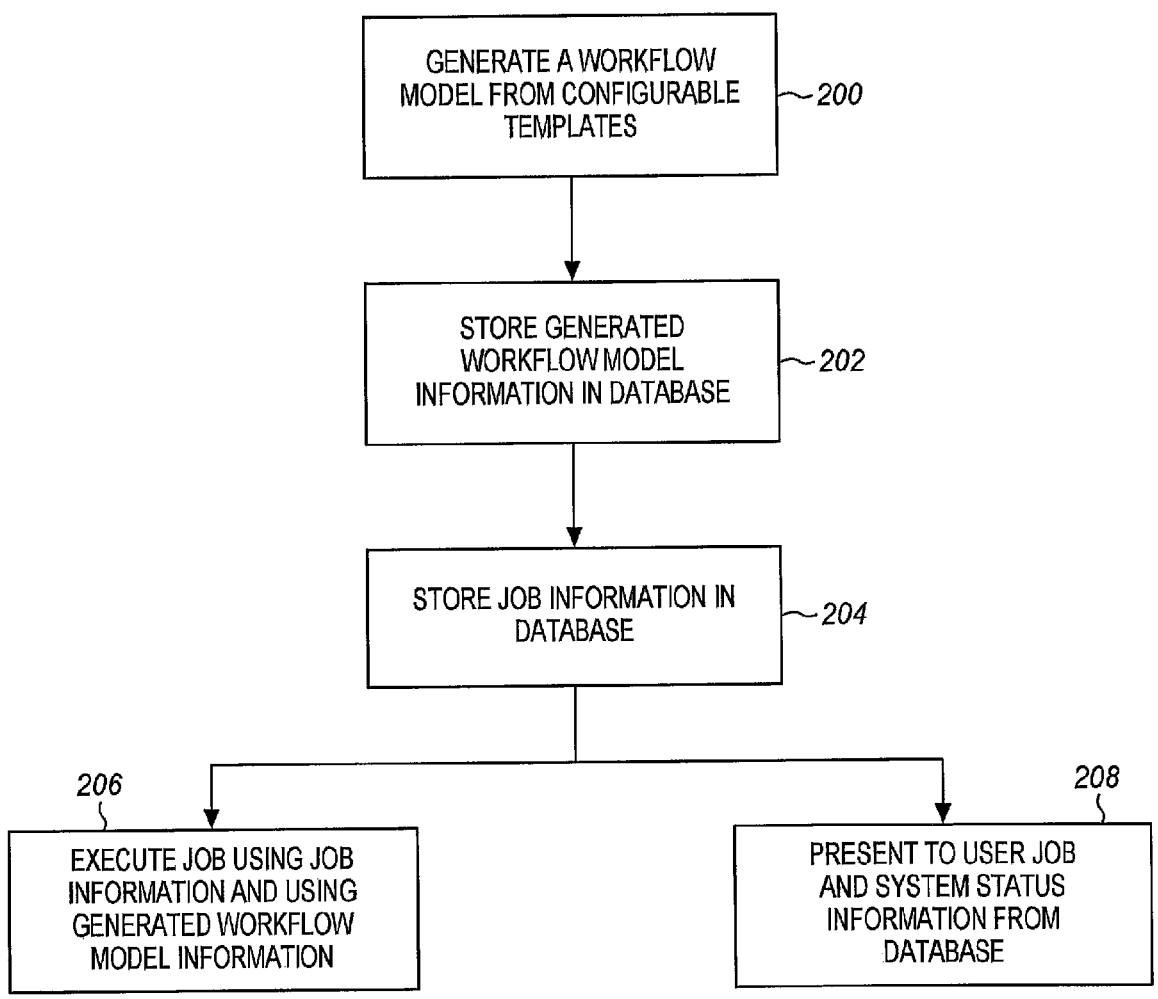
FIGS. 2 through 4 are flowcharts describing exemplary methods for workflow configuration and execution in accordance with features and aspects hereof.

FIG. 2 is a flowchart broadly describing a method in accordance with features and aspects hereof to generate and execute workflow models to process jobs in accordance with a configured workflow model. Element 200 is first operable to generate a workflow model from configurable templates. As noted above, the configurable templates may include phase templates, process templates, and step templates all useful for customizing and configuring a particular workflow model for a particular application. Unlike prior techniques, generation of a workflow model from flexibly configurable templates requires little professional engineering expertise such as is required for generating fully customized program instructions to implement a particular workflow model for processing of a job. Further, by contrast with other prior techniques, the configurable templates supplied in accordance with features and aspects hereof permit a high degree of flexibility in customizing or configuring particular phases, processes, and steps for a particular workflow processing application. Prior simpler workflow processing systems provided little or no configurability thus forcing the user to adapt the workflow processing application to the particular static model already defined by the workflow processing system. Users had little or no capability to easily customize or reconfigure the workflow system for particular desired workflow processing of particular job applications.

As noted above, a configured workflow model stored in the workflow database may then be executed by a workflow processing engine. The workflow engine (not shown) may be integrated with each workflow server and manages the processing steps required to produce the desired printed product by using information in the workflow database. These steps can be automatic or manual. The list of steps and the transitions between them are maintained in the database so that changing a process or creating a new process is a simple matter of configuring the appropriate database tables. Steps are modular and perform units of work with clearly defined interfaces. Steps may interface with system resources, such as a PostScript transform or an IBM PSF printer driver. Steps may interface with third-party software, such as address cleansing or inventory control. Steps may perform work directly on the database or the files associated with a job.

Element 202 is then operable to store the generated workflow model as information in the workflow database of the workflow system. A job type attribute or other suitable indicia may be used to identify the particular types of jobs for which the newly configured model may be applied. The database entries representing the workflow model information may be easily reconfigured by simple database query and update operations (such as the SQL query language) again utilizing the configurable templates provided in accordance with features and aspects hereof. As noted above, each database entry for the model generated from a template may include a wide variety of configurable attributes and parameter values to allow each phase, process, or step to be reconfigured for a particular new job or application.

Element 204 represents further processing to create a new job and store job related information in the workflow database. As noted above, the integrated database includes both the workflow model information and the job information for individual jobs. Thus the workflow database integrates all data for jobs being processed as well as the workflow model information describing the workflow processing to be performed for each of multiple types of jobs to be processed. The database tables contain entries for each job in the system, including all job metadata such as job originator, current processing step, number of pages, number of copies, desired paper stock(s), finishing needs, and so on. The database also is the repository for real-time data monitoring the print shop floor. Such printer characteristics as pages printed, currently-printing job, toner status, etc. can be kept in the database (assuming the printers are capable of reporting these items). Similar information can be kept on any print shop equipment, including inserters, finishers, etc. The database also maintains the history of jobs and devices and when the status of each job and/or device changed. This allows the system to report relevant statistics that might identify a device that needs service or an operator who is unusually efficient.

Job metadata may be any information associated with the job including, for example, billing or charge-back information, the desired delivery date, and any other information needed to produce the job. This information is often referred to a job ticket. Because the job ticket is in the database, any step that needs to access ticket information can easily do so. New metadata items simply add a new entry in the database and flow through the system without requiring system changes.

Having so generated and stored information regarding one or more jobs to be performed and one or more associated workflow models, elements 206 and 208 are then operable substantially concurrently. Element 206 is generally operable to execute the job using the job information and the generated workflow model information in the workflow database. Execution of the job generally entails retrieving information from the database for a next phase to be processed and for the next process and steps within that phase. The execution engine then retrieves associated job information and performs appropriate next steps in accordance with the customized, configured workflow model. Eventually, when all steps, processes, and phases for processing of a job have completed, execution of the job is thus completed and desired results obtained.

Substantially in parallel with operation of element 206 to execute jobs, element 208 may be operable to monitor status information regarding the jobs and the various workflow models associated with the various jobs. The status information so monitored may be presented to a user to provide near real time feedback as to the progress in processing each of the one or more jobs being executed within the workflow system. Status information regarding the various jobs and currently executing workflow models may also be stored within the database. Thus, element 208 is generally operable to retrieve current status information regarding the execution of each of one or more jobs within the workflow system and to present that retrieved status information to a user in near real time.

Those of ordinary skill in the art will readily recognize a wide variety of graphical user interface techniques for presenting such status information. Further, the status information may include information regarding each job presently executing or queued for execution within the workflow system, as well as status information regarding the various devices, components, modules and other elements used by the workflow system to execute each job known to the system. For example, as applied to printing systems as described above, status information may include status of each print engine known to the system, each print server known to the system, each post processing element known to the system, etc. Thus, in a single integrated database, all status information regarding the performance of the workflow system may be stored and retrieved for presentation to a user in accordance with operation of element 208.

FIG. 7 depicts an exemplary display screen useful for presenting such status information and for interacting with a user to control the state of devices and/or print jobs. A "System Summary" portion of the display screen summarizes the count of the number of print jobs in each phase of processing (e.g., Receive, Prepare, Print, Complete) and the count of print jobs in each state of each phase (e.g., Preprocessing, Active, Manual, Error). A "Printers" portion of the exemplary display screen shows a user the known printers and the status of each known printer. In addition, this portion of the screen may permit user interaction (e.g., through "click" buttons on the screen) such as to Enable or Disable a selected printer. Still another portion of the display screen presents detailed status regarding "Active Jobs In Print Phase"—in other words details regarding all print jobs presently printing in the Print phase of the respective workflow model. As above, this portion of the screen may provide "click" buttons for user interaction to change the state of a selected print job such as to Stop or Continue the printing thereof or to Process Again where a job needs to be reprinted. Those of ordinary skill in the art will readily recognize a variety of equivalent display and interaction techniques that may be employed to present status information regarding printers and print job or more generally any jobs and devices of a workflow system in accordance with features and aspects hereof. In particular, presentation of information regarding the present phase, process, step, and state of any job and the present state of any device in the system may be presented by retrieving corresponding information from the workflow database.

Figure 3:
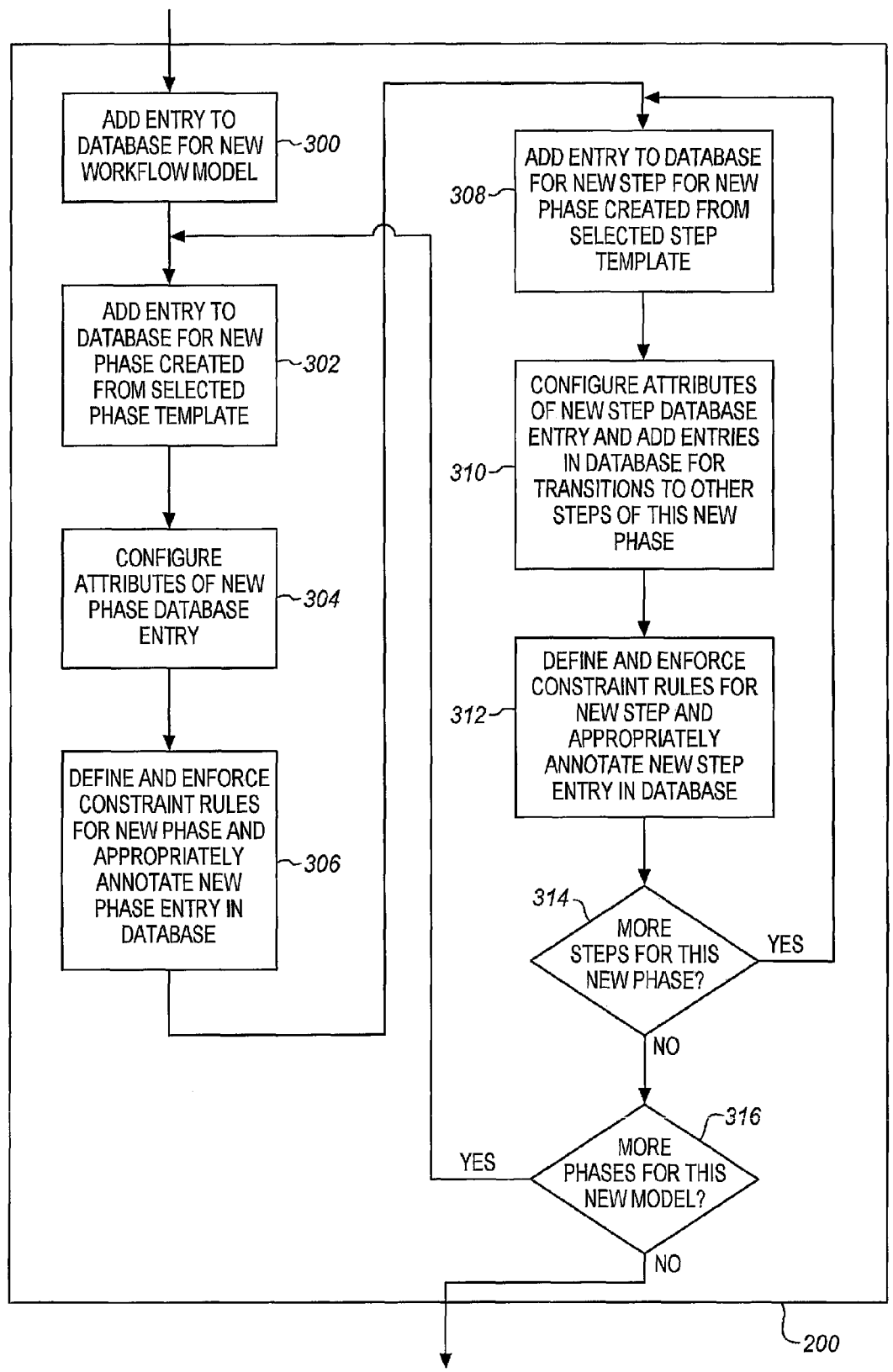

FIG. 3 is a flowchart providing additional exemplary detail of the operation of element 200 of FIG. 2. As noted above, element 200 of FIG. 2 is generally operable to generate a new workflow model based on configurable templates provided in accordance with features and aspects hereof. Element 300 of FIG. 3 is therefore first operable to add a new entry to the workflow database describing a new workflow model useful for processing an associated job type. Element 302 then adds an entry to the workflow database for a first or next newly created phase configured utilizing a selected phase template. As noted above, a user is provided with a rich collection of useful phase templates that may be easily configured to adapt to a particular desired workflow processing application or type of job. Thus, element 302 represents processing for a user to identify a preferred phase for adding to the workflow model by selecting the corresponding template. The newly created database entry for the phase is then customized or configured by operation of element 304 by configuring or setting attribute or parameter values associated with the selected phase template.

Element 306 is then operable to define and enforce any constraint rules associated with the newly created and configured phase. Such constraints are useful for helping to assure that the user does not improperly configure new phases or steps contrary to the user's own rules for the intended applications. Such rules may be defined as simple Boolean predicates testing, for example, whether a particular phase may occur first or must occur last, etc. The database entry for the newly defined phase is appropriately annotated to reflect the additional constraints or validation rules defined for the newly configured phase of the new workflow model. In addition, the defined rules are applied as the user continues to configure the new workflow model. Thus, element 306 represents processing not only to define the rules but to apply the rules to validate the current design. Other exemplary constraints are discussed in additional detail herein below.

Elements 308 through 312 are similarly operable to add one or more new database entries for new steps associated with the newly defined and configured phase. Each step to be added to the newly configured phase is configured by selecting a desired step template from the step templates provided by the workflow system. The selected template is then used to create a new database entry for the new step and the new step database entry is associated with the new phase currently being defined. In addition, element 310 represents further processing to define any appropriate transitions from the newly defined a step to other previously defined steps (if any) in this currently defined phase.

Transitions from step to step or from phase to phase are defined and provided as annotations to the various entries or may be defined as a separate table in the workflow database. Thus, a user may configure complex workflow processes by configuring any number of phases each including any number of steps and by specifically defining desired transition conditions from step to step and from phase to phase.

Element 314 is operable to determine whether more steps are desired to be defined in the new phase currently being configured. If so, processing continues to iterate through elements 308 and through 314 until no further steps need be configured in the new phase currently being defined. Processing then continues at element 316 to determine whether the user wishes to configure additional new phases in the new workflow model being defined. If so, processing continues looping back to element 302 until all desired phases have been defined in the new workflow model.

As noted above, in accordance with features and aspects hereof, phases may also include multiple processes such that each process within a phase may include one or more steps. Although not shown in FIG. 3, those of ordinary skill in the art will readily understand that the method may be simply modified to incorporate the definition of additional processes within a phase each of which then includes one or more steps.

Figure 4:
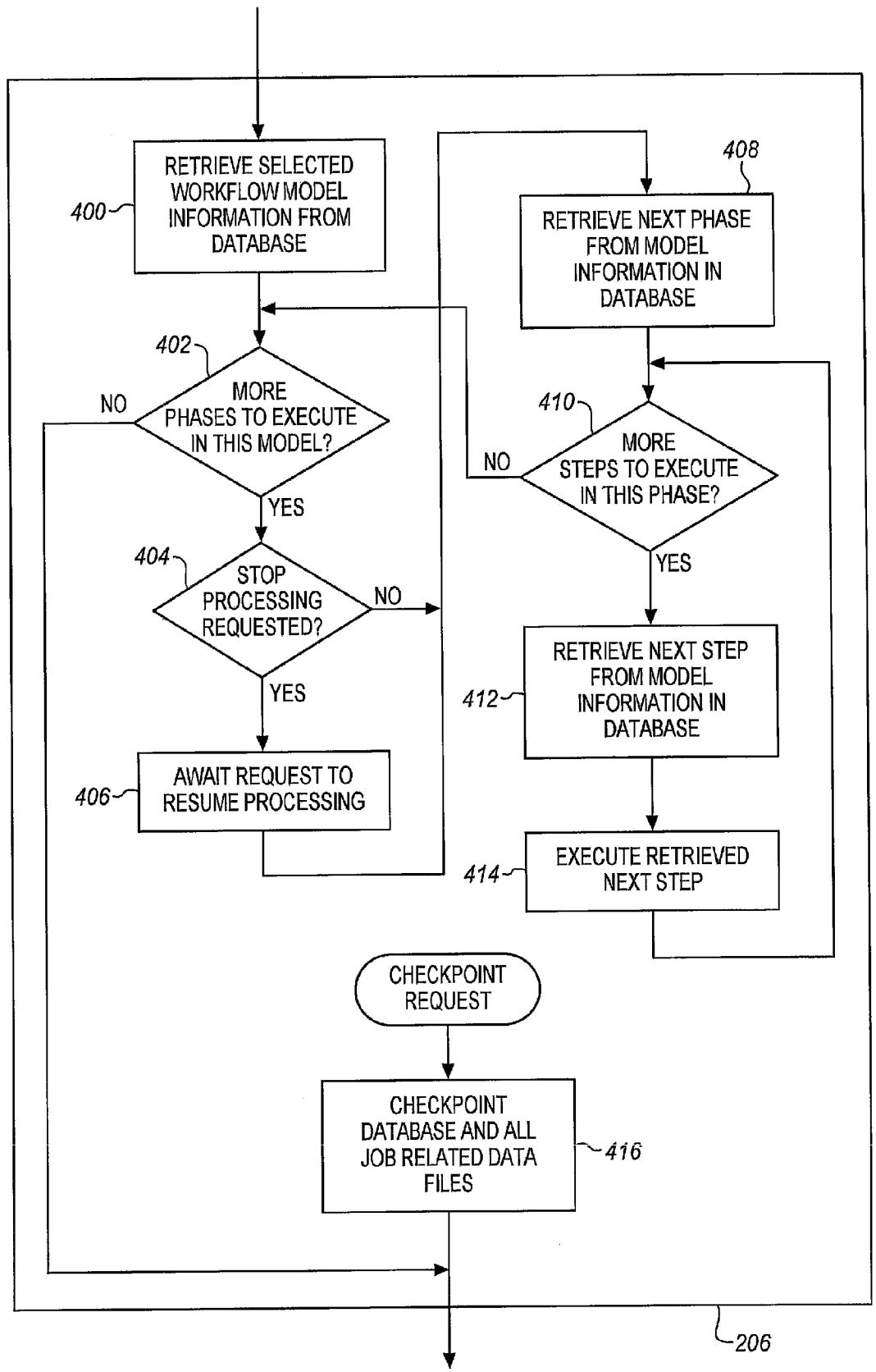

FIG. 4 is a flowchart providing additional exemplary details of processing by element 206 of FIG. 2 above. As noted above with reference to FIG. 2, element 206 is generally operable to execute a job using job information stored in the workflow database and using generated workflow model information stored in the workflow database. Element 400 of FIG. 4 is operable to retrieve information from the workflow database relating to a selected workflow model. The selected workflow model is the workflow model customized and configured to process a job type matching that of the particular job to be executed.

As noted above a workflow model includes one or more phases of operation. Element 402 then determines whether more phases remain to be executed for the job presently executing in accordance with the present workflow model. If not, processing by element 206 is completed. If so, element 404 next determines whether a stop processing event or action has been encountered. A stop or pause in the processing of the job may be requested by detection of particular events such as by operator interaction or by any other suitable mechanism. In general, processing may stop upon completion of a phase or upon commencement of processing for a next phase.

If processing has been stopped due to detecting an appropriate event, element 406 is operable to await resumption of processing. Resumption may be requested in response to detection of another event such as by operator input or by other suitable mechanisms. When processing resumes, element 408 is operable to retrieve a next phase from the current model information retrieved from the database. Element 410 then determines whether any steps remain to be executed in the presently executing phase of the workflow model. If not, processing continues looping back to element 402 to continue processing additional phases of the workflow model (if any). If more steps remain to be executed in the present phase, element 412 is next operable to retrieve a next step from the model information in the workflow database. Element 414 then executes the retrieved next step and loops back to element 410 until all steps have been retrieved for the present phase and executed.

As noted above with regard to generation and configuration of the workflow model, each phase may comprise one or more processes which may, in turn, each comprise one or more steps. For simplicity and brevity of this description, discussion of processing of multiple processes within a phase has been removed. Those of ordinary skill in the art will readily recognize appropriate modifications to the method of FIG. 4 to incorporate processing of one or more processes within each phase of a work model.

Phases, Processes, and Steps

A job is executed in accordance with the phases, processes and steps configured as a workflow model and stored in the workflow database. Features and aspects hereof are therefore largely driven by a workflow engine that, in turn, retrieves its process flow information from workflow database tables. Changing the system processes is a simple task of configuration: i.e., changing the database table content. The only custom coding requirements are those needed for any new processing steps not previously anticipated by an earlier defined phase, process, or step template. Rearranging or eliminating steps in an existing process or phase requires no coding, only configuration.

A feature hereof that makes the system configurable is its use of SQL. For example, the list of jobs in a certain queue is simply an SQL query that lists the database entries with a specific queue name. To add a new queue, a user need only create a query that selects the jobs with attribute values related to particular attribute values of interest. Job metadata is simply attributes and values in a database table. To add a new item, a row is simply added to the metadata table. Such simple database transactions are well known to those of ordinary skill in the art and require little or no costly programming expertise.

In accordance with features and aspects hereof, workflow is divided into phases, such as Receive or Prepare, and processes within those phases. A process is a sequence of steps that perform a logical set of actions on the jobs they process. Any particular job will flow through a particular set of phases, selecting a single set of processes in each phase. The ordered set of steps, grouped by the processes and phases that contain them, determine the workflow processing for a job.

Features hereof define how phases, processes, and states are represented in the system and define their interfaces. As users use the system creating new workflow models and new templates, they will build up a set of reusable phases and processes that may be applicable to several workflow processing applications. For example, the Receive phase and its processes will likely be used in almost every workflow process to receive a new job for processing.

The descriptions herein above present features and aspects as broadly applicable to any general workflow application. Features and aspects hereof may also be readily understood with reference to a particular application, namely: workflow processing for print jobs in a printing environment. In large scale printing facilities for data processing enterprises, large numbers of print jobs may be generated and distributed over a similarly large number of printers, print servers, post processing devices, etc. One particularly useful application of features and aspects hereof is to management of workflow associated with processing print jobs in such a large scale printing environment.

Jobs and workflow models in the database may each be associated with a job type. The value assigned to a JobType attribute of a job determines the particular workflow processing a job receives when moving through the system. The JobType determines the choice and order of the phases within the workflow for each job. It also chooses the process within each of the selected phases. This is realized by the Job.Process.After.phase_name attributes and the Transitions table entries.

The workflow engine does not determine the transitions between processes and phases; that is left to the Transitions database table. When each step completes, the workflow engine invokes its ChangeJobState method to set the job to its output state and then to set the job to the input state of the next step according to the Transitions table.

Figure 5:
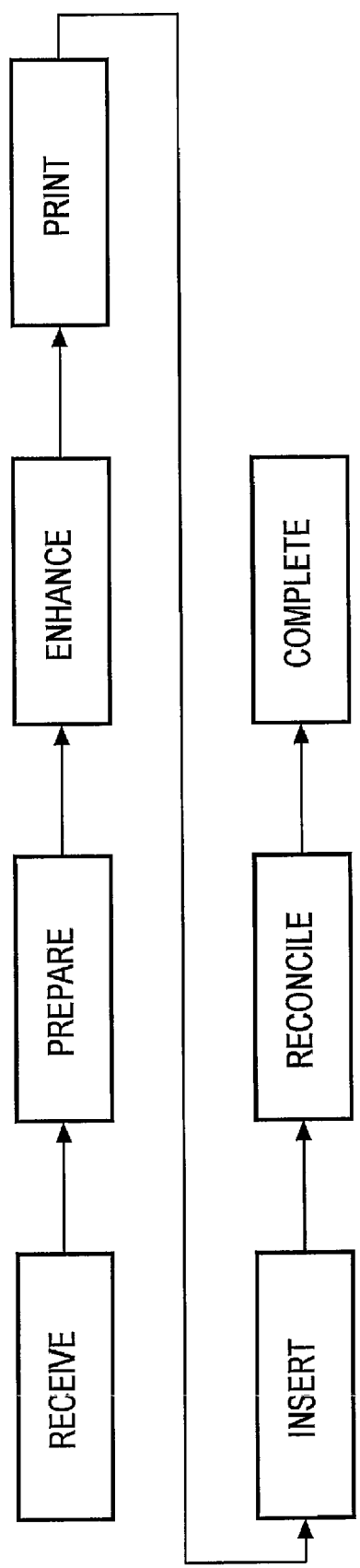
FIG. 5 is a diagram depicting exemplary phases of an exemplary workflow for print job processing in accordance with features and aspects hereof.

Exemplary phase and steps templates are discussed herein below that are readily configurable for application to such large scale printing environment workflow processing systems. FIG. 5 is a block diagram broadly describing exemplary phases useful in processing print jobs in such a printing environment. Table 1 below more fully describes these exemplary phases, the inputs associated with each phase, the output generated by each phase, and a description of the purpose and operation of each phase.

TABLE 1

Exemplary Phases for Print Job Workflow Processing

| Phase | Inputs | Outputs | Description |
|---|---|---|---|
| Receive | Print Data file | InputJob | Receives new jobs into the system, sets initial job attributes, determines initial phase, step and state |

TABLE 1-continued

Exemplary Phases for Print Job Workflow Processing

| Phase | Inputs | Outputs | Description |
|---|---|---|---|
| Prepare | Input-Job | Indexed-AFPJob PrintJob | Composes, transforms and indexes input data to create page data and associated metadata. Produces IndexedAFPJob for future document-level activities. Produces PrintJob for PDF, PCL, etc. input jobs and future job-level activities. |
| Enhance | Indexed-AFPJob | PrintJob Inserter-Control | Modifies page data to add manufacturing information, such as barcodes. Adds and deletes pages according to late-binding business logic. Groups and orders page data for efficient manufacturing. Creates inserter control file. |
| Print | Print-Job | | Helps operator route job to eligible printer. Performs late-binding datastream transformation. Transmits print job to desired printer. Monitors print status. Reports print completion. |
| Insert | Inserter-Control | Inserter-Result | Transmits inserter control file to inserter. Monitors inserter for completion. |
| Reconcile | PrintJob Inserter-Result | PrintJob | Helps operator reconcile damaged mailpieces with desired mailpieces to determine ones to reprint. Creates reprint job and routes to Print. |
| Complete | Any Job | | Marks jobs and their ancestors complete. Manages retain period. Deletes expired jobs and cleans spool file area. |

Figure 6:
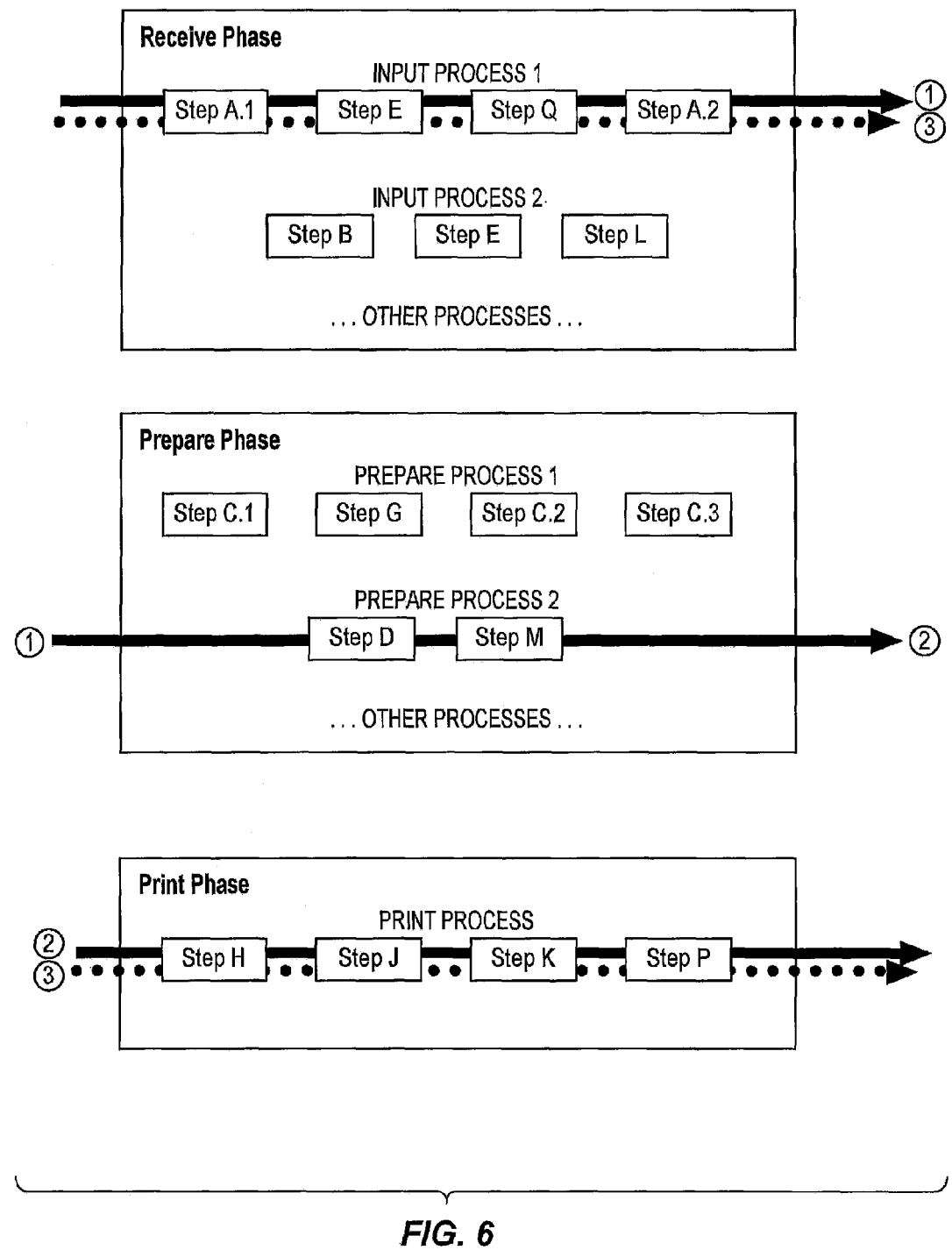
FIG. 6 is a diagram describing a particular example of two exemplary jobs processed in corresponding exemplary workflow models in accordance with features and aspects hereof.

It is further helpful to explain the use of phases, processes, and steps to define and execute a workflow model with reference to exemplary print job processing with exemplary database tables. FIG. 6 and the following tables help explain the operation of change in a job's state within and between processes or phases. FIG. 6 illustrates the hierarchy of phases, processes, and steps. The heavy solid arrow indicates one particular job type's path through Receive, Prepare, and Print phases. The heavy dotted arrow indicates a different job type's path that uses only Receive and Print phases. Table 2 illustrates exemplary transitions table rows for the exemplary Receive phase. Table 3 illustrates exemplary transitions table rows for the exemplary Prepare phase and Table 4 illustrates some exemplary rows for the Print phase. Table 5 illustrates the relevant, exemplary job attributes for the two jobs depicted as paths through FIG. 6.

TABLE 2

Exemplary Transitions Table (Receive Phase)

| | Receive Phase | | | | |
|---|---|---|---|---|---|
| Column Name | Row 1 | Row 2 | Row 3 | Row 4 | Row 5 |
| FROM_PROCESS_NAME | InputProc1 | InputProc1 | InputProc1 | InputProc1 | InputProc1 |
| FROM_OUTPUT_STEP | StepA.1 | StepE | StepQ | StepA.2 | StepA.2 |
| FROM_OUTPUT_STATE | Complete | Complete | Complete | Complete | Complete |
| TO_PROCESS_NAME | InputProc1 | InputProc1 | InputProc1 | PrepProc2 | PrintProc |
| TO_INPUT_STEP | StepE | StepQ | StepA.2 | StepD | StepH |
| TO_INPUT_STATE | Ready | Ready | Ready | Ready | Ready |
| CONDITIONAL_ATTR_NAME | [no value] | [no value] | [no value] | Job.Process.After.Receive | Job.Process.After.Receive |
| CONDITIONAL_ATTR_VALUE | [no value] | [no value] | [no value] | Prepare.PrepProc2 | Print.PrintProc |

TABLE 3

Exemplary Transitions Table (Prepare Phase)

| | Prepare Phase | |
|---|---|---|
| Column Name | Row 6 | Row 7 |
| FROM_PROCESS_NAME | PrepProc2 | PrepProc2 |
| FROM_OUTPUT_STEP | StepD | StepM |
| FROM_OUTPUT_STATE | Complete | Complete |
| TO_PROCESS_NAME | PrepProc2 | PrintProc |
| TO_INPUT_STEP | StepM | StepH |
| TO_INPUT_STATE | Ready | Ready |
| CONDITIONAL_ATTR_NAME | [no value] | Job.Process.After.Prepare |
| CONDITIONAL_ATTR_VALUE | [no value] | Print.PrintProc |

TABLE 4

Exemplary Transitions Table (Print Phase)

| | Print Phase | | |
|---|---|---|---|
| Column Name | Row 8 | Row 9 | Row 10 |
| FROM_PROCESS_NAME | PrintProc | PrintProc | PrintProc |
| FROM_OUTPUT_STEP | StepH | StepJ | StepK |
| FROM_OUTPUT_STATE | Complete | Complete | Complete |
| TO_PROCESS_NAME | PrintProc | PrintProc | PrintProc |
| TO_INPUT_STEP | StepH | StepK | StepP |
| TO_INPUT_STATE | Ready | Ready | Ready |
| CONDITIONAL_ATTR_NAME | [no value] | [no value] | [no value] |
| CONDITIONAL_ATTR_VALUE | [no value] | [no value] | [no value] |

TABLE 5

Exemplary Job Attributes for Jobs of FIG. 6

| Column Name | Row 1 | Row 2 |
|---|---|---|
| JOB_ID | 0001 | 0002 |
| PROCESS.AFTER.SUBMIT | Receive.InputProc1 | Receive.InputProc1 |
| PROCESS.AFTER.INPUT | Prepare.PrepProc2 | Print.PrintProc |
| PROCESS.AFTER.PREPARE | Print.PrintProc | |
| . . . other columns . . . | | |

Now with reference to the above tables 2-5 and to FIG. 6, the exemplary workflow may be described. The job represented by the solid arrow in FIG. 6 is assigned JobId 0001 according to Table 5. Its initial state is the InputProc1 process, ready to process the StepA.1 step, and in the Ready state. This state may be represented as: InputProc1:StepA.1:Ready.

1. StepA.1 completes for Job 0001. ChangeJobState queries the jobs table to determine the current process, step and state for Job 0001. It moves the job to state InputProc1:StepA.1:Complete. It queries the transitions table to find a row that matches the job's current state. This is Row 1 in the example. It then moves the job to the "To" state of Row 1: InputProc1:StepE:Ready. Note that transitions within a process, such as this one, do not require a value for CONDITIONAL_ATTR_NAME and CONDITIONAL_ATTR_VALUE.
2. As StepE completes, ChangeJobState locates Row 2 and moves the job to InputProc1:StepQ:Ready.
3. As StepQ completes, ChangeJobState locates Row 3 and moves the job to InputProc1:StepA.2:Ready. Note that this is the second instance of StepA in this process and is distinguished from the first instance by its name "StepA.2".
4. As StepA.2 completes, ChangeJobState locates Rows 4 and 5. There are two transitions in the table that match the job's current state. Row 4 applies to this job type; row 5 applies to the dotted arrow job type. Because this transition is leaving a phase, there are multiple possible transitions and ChangeJobState consults the CONDITIONAL_ATTR_NAME and CONDITIONAL_ATTR_VALUE columns of the transitions. The job's Job.Process.After.Receive attribute value matches Row 4's CONDITIONAL_ATTR_VALUE, so ChangeJobState moves the job to PrepProc2:StepD:Ready. The same mechanism in ChangeJobState moves jobs from step to step within a process and from the last step of one process to the first step of another.
5. As StepD completes, ChangeJobState locates Row 6 and moves the job to PrepProc2:StepM:Ready.
6. As StepM completes, ChangeJobState locates Row 7 and moves the job to PrintProc:StepH:Ready.
7. As StepH completes, ChangeJobState locates Row 8 and moves the job to PrintProc:StepJ:Ready.
8. As StepJ completes, ChangeJob State locates Row 9 and moves the job to PrintProc:StepK:Ready.
9. As StepK completes, ChangeJobState locates Row 10 and moves the job to PrintProc:StepP:Ready.

The job represented by the dotted arrow in FIG. 6 is assigned JobId 0002 according to Table 5. Its initial state is InputProc1:StepA.1:Ready.

1. As StepA.1 completes, ChangeJobState locates Row 1 and moves the job to InputProc1:StepE:Ready. This is identical to JobId 0001.
2. As StepE completes, ChangeJobState locates Row 2 and moves the job to Receive:InputProc1:StepQ:Ready. This is identical to JobId 0001.
3. As StepQ completes, ChangeJobState locates Row 3 and moves the job to InputProc1:StepA.2:Ready. This is identical to JobId 0001.
4. As StepA.2 completes, ChangeJobState locates Rows 4 and 5. There are two transitions in the table that match the job's current state. The job's Job.Process.After.Receive attribute value matches Row 5's CONDITIONAL_ATTR_VALUE, so ChangeJobState moves the job to PrintProc:StepH:Ready. Note that this job skips the Prepare phase entirely.
5. As StepH completes, ChangeJobState locates Row 8 and moves the job to PrintProc:StepJ:Ready.
6. As StepJ completes, ChangeJobState locates Row 9 and moves the job to PrintProc:StepK:Ready.
7. As StepK completes, ChangeJob State locates Row 10 and moves the job to PrintProc:StepP:Ready.

The exemplary structures and methods just described are very flexible in that they may be configured for use with any number of print job workflows as well as other application areas. Transitions from step to step or from phase to phase are selected based on any job attribute. This example has used Job.Process.After.phase_name, but other workflows may choose the desired process or step based on an entirely different attribute.

The ChangeJobState function updates current job's row in the jobs table with the desired output state of the step that calls it. ChangeJobState then updates the current job to the next input state, if any. This action enqueues the job on the input queue for the following step.

Note that all steps automatically consult their input queues when they complete their task for a job, and so will continue to process queued jobs without the need to be restarted for the new task. A queue will develop only when the number of allowed instances of a step is not sufficient to handle the number of jobs that request the step or when the job is held or at a lower priority than currently-active jobs.

At system startup, all jobs in an input state for any step will be started, subject to the maximum run count limitations for the step.

A step is a unit of workflow processing. A step may do one action or it may do several related actions that always occur in the same sequence. A step may:

1. Operate on job files, such as software/automated step that creates an AFP file from a line data input file.
2. Set job attributes, such as a step that counts the number of pages in an AFP document.
3. Require user interaction, such as a Quality Control step that asks the operator several questions before releasing the job to the next step.
4. Interact with a hardware device manager, such as the Print step that submits jobs for printing.

Each job being processed by a step has a job state. All steps have at least the following states (and may have more):

1. Queued state indicates the job is queued for processing by the step.
2. Processing state indicates the step is working on the job.
3. Complete state indicates the step has completed processing for the job.
4. Error state indicates the step had a problem processing the job and will not continue working on it.

Note that some steps may have more input states than just Queued, more processing states than just Processing, and more output states than just Complete. For example, a job in the Print step has many processing states representing the various printing stages such as Spooling and Printing.

Steps may ask for jobs in a particular state (Ready is typical) and can set jobs to new states. When a step has completed processing of a job, it calls ChangeJobState to set the job's final state. ChangeJobState uses the transitions table to discover where to move a job from its output state (e.g., Complete) to the appropriate input state (e.g., Ready) of the next step in the job's workflow.

Each step can place a job in Error state if it encounters a problem in processing. The job remains in Error state until an operator intervenes. The step should log an error message so the operator knows what action to take to correct the problem.

Jobs in error state can be moved to a different state using a graphical user interface. Exemplary options are:
1. Job Restart, which repositions the job to an earlier step in the workflow.
2. Continue, which clears the error and lets the job continue with the next step in the process.
3. ForceToProcessEnd, which clears the error and lets the job continue as if it had successfully completed the process.
4. Purge, which moves the job to the Complete process so it can be cleanly removed from the system.

Phase/Step Constraints

As noted above, phase templates and step templates may include constraints or rules used to validate proper use of the template. The constraints are applied or executed as a new phase or step is created from the template to validate use of the template in creating a new phase or step in a workflow model.

These constraints are validation rules for the job type, and may include, for example:

Phase-Step Constraints, such as "this step must occur only in Prepare phase", or "this step must be last in the phase", or "this step must occur before step X", Attribute Constraints, such as "this step requires that attribute xyz must have a value". Attributes that a particular step template writes are also defined, so it is possible to validate a job type by determining that some step has written every attribute that the current step requires.

File Constraints, such as "this step requires that an AFP file exists". The files that a particular step template writes are also defined, so it is possible to validate a job type by determining that some step has written every file that the current step requires.

Describing these constraints on the phase or step templates sets up the rules for configuring workflow models and makes it easier for administrators to configure new workflow models.

Load Balancing

Features and aspects hereof provide the ability to balance the workload of running steps within multiple servers of the workflow system. There are in general at least two objectives to workload balancing. One objective is to regulate where steps run. Some steps may be required to run only on certain servers. Another objective is to limit the number of active steps. There are a limited number of resources available on a system and so the number of steps is limited to avoid over committing those resources.

Three types of objects are involved in balancing the step workload on the systems:

The step adapter manager keeps a queue of jobs and input files that are waiting to be processed by a step.

The server identifies the environments for processing steps.

The step template identifies the processing to be performed.

Each step template has the following workload balancing attributes:

StepTemplate.UseGeneralServerPool—Yes or No. If "Yes" then the step template will use any server in the general pool of servers, otherwise only the servers in the StepTemplate.Servers attribute will be used.

StepTemplate.Servers—a List containing the servers that this step template can use for processing. This attribute will be null if StepTemplate.UseGeneralServerPool is Yes.

StepTemplate.HighResourceUsage—either Yes or No. If "Yes" then the step is counted toward the high resource usage limit of the server, otherwise it is counted toward the low resource usage limit of the server.

StepTemplate.MaximuinActiveUnit and StepTemplate.MaximumActiveCount—These two attributes regulate the maximum number of instances of the step template that can be active.

These attributes are only used if StepTemplate.HighResourceUsage is set to No. The unit can be: per workflow system, per server, per input device or per printer. The count is applied to the unit to regulate the active steps. For example if the unit is "per server" and the count is 1, then each server would be allowed to run no more than one instance of the step at any given time. These attributes are set to null if the StepTemplate.HigbResourceUsage value is set to Yes. If the value is No then these attributes are required.

The workload balancing attributes for a server regulate which steps can be processed on that server and the number of high resource usage steps that can be processing at any given time. The Server workload balancing attributes are:

Server.InGeneralServerPool—Yes or No. If "Yes" then step templates that have StepTemplate.UseGeneralServerPool set to Yes can use the server. If "No" then step templates that have StepTemplate.UseGeneralServerPool set to "Yes" will not use the server. Either value will allow the server to be listed in a step template's StepTemplate.Servers attribute.

Server.MaxHighUsageSteps—is the maximum number of high resource usage steps that can be active on the server concurrently.

Server.MaxLowUsageSteps—is the maximum number of low resource usage steps that can be active on the server concurrently.

Each server has a current workload based on the steps that are currently running on that server. The workload is the sum of the loads of the steps that are processing on the server. The load of a step is computed. For each server there is a load associated with high resource usage steps and another load associated with low resource usage steps. The load of a step is computed by dividing 100 by Server.MaxHighUsageSteps or Server.MaxLowUsageSteps depending on the step's resource usage. If either Server.MaxHighUsageSteps or Server.MaxLowUsageSteps is zero then no load is computed for that type of step.

If a step can be started on one of several servers then the step adapter manager will start the step on the server with the lowest workload. Steps will not be started on a server that has a workload of 100 or more. To avoid starvation of high resource usage steps the workload of a server is allowed to exceed 100, but no additional steps will be scheduled if the workload exceeds 100.

Checkpoint and Restart

Steps can be configured as restartable (via steps: restart_type), which means that a job may be returned to the start of the step from either an error condition within the step or from a later step.

Steps can also be configured as forceable (via steps_job forceable_here), which means that a job in Error state may be forced to the Complete state by the user interface "Force Complete" action. Not all steps may allow the user to override an error in this way; job_forceable_here determines which steps allow the action for authorized users and which do not.

To determine the list of restartable steps for a job, StepManager makes a record (via restart_steps) of each step for which the job has entered "Processing" state. When the user selects "Process Job Again" or other restart action, the user interface is supplied with the list of steps with a restartable restart_type that the user may choose from.

To carry out the restart action, the StepManager can change the job's state to be Queued to the restart step. It may be assumed that any attributes that may have been set during the intervening steps either do not matter or will be reset by the step execution. Data files, however, may have significantly changed during the intervening steps and must be restored to their original state for the restart action to succeed.

To enable restart, any data files that a step will change are first checkpointed to save a version of the original form of a file at entry to the step for later restoration as part of a restart action. When sending a job back to an earlier restartable step, StepManager must replay any intermediate data checkpoints to ensure the spool is returned to its original state, so the step can operate on the same data as before.

Figure 8:
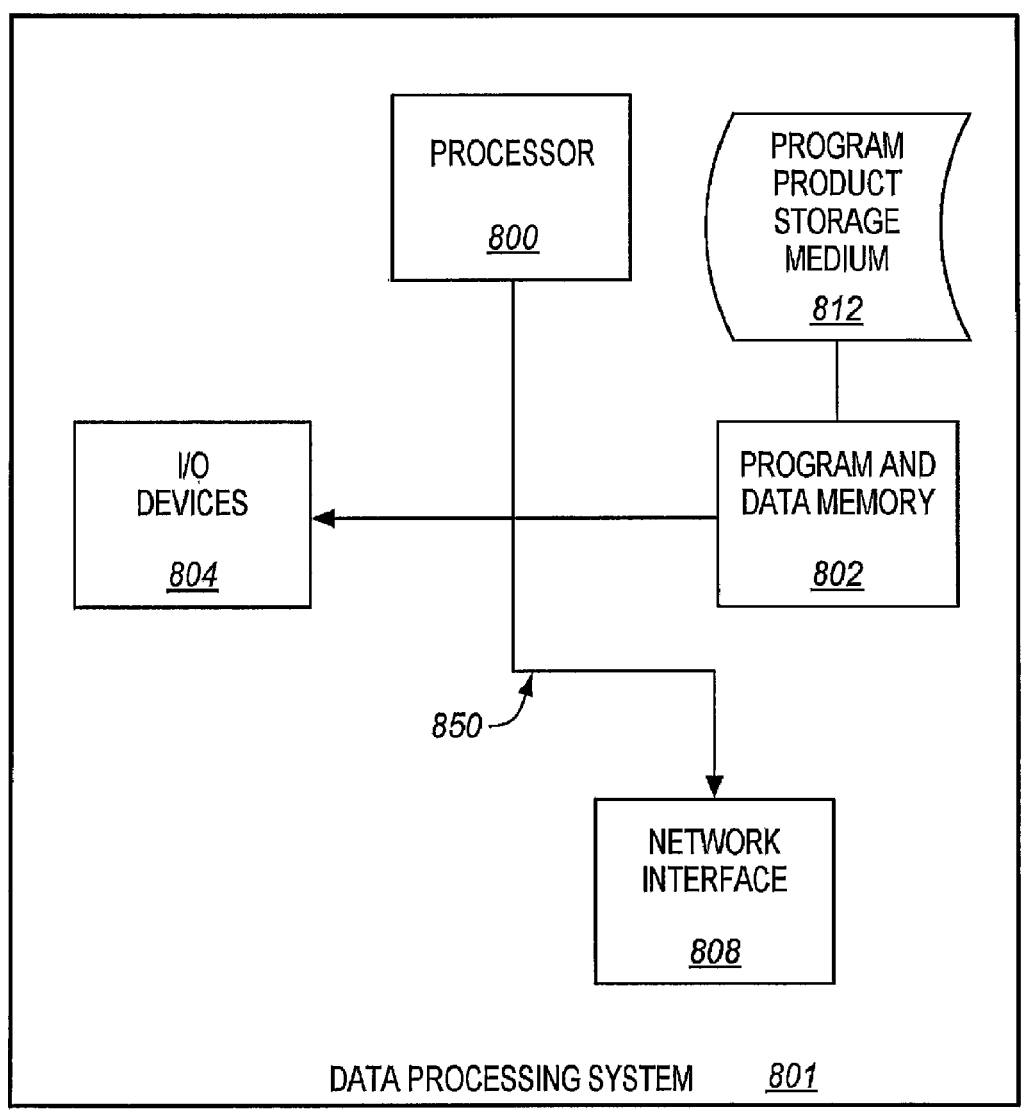
FIG. 8 is an exemplary block diagram depicting a data processing system.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 8 is a block diagram depicting a data processing system 801 as a data processing device adapted to provide features and aspects hereof by executing programmed instructions and accessing data stored on a computer readable storage medium 812.

Furthermore, the invention can take the form of a computer program product accessible from a computer-usable or computer-readable medium 812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 800 coupled directly or indirectly to memory elements 802 through a system bus 850. The memory elements can include local memory employed during actual execution of the program code, bulk storage, and cache memories which provide temporary storage of at least some program code in order to reduce the number of times code must be retrieved from bulk storage during execution.

Input/output or I/O devices 804 (including but not limited to keyboards, displays, pointing devices, etc.) can be coupled to the system either directly or through intervening I/O controllers. Network adapter interfaces 806 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A computer implemented method for managing a workflow processing system, the method comprising:
   storing, by operation of a server, job information in a database, wherein the job information relates to one or more AFP print jobs to be processed by the workflow processing system;
   displaying, by operation of the server, one or more configurable templates stored in the database, wherein each of the configurable templates comprises one of: a configurable phase template, a configurable process template, or a configurable step template, wherein each configurable phase template comprises one or more configurable process templates, and wherein each configurable process template comprises one or more configurable step templates;
   receiving, by operation of the server, user input selecting one of the one or more configurable templates;
   receiving, by operation of the server, user input to alter an attribute value and/or a parameter value of the selected configurable template to generate a new configurable template;
   adding, by operation of the server, the new configurable template in the database as one of the one or more configurable templates;
   generating, by operation of the server, a workflow model to process the one or more AFP print jobs relating to the job information in the database, wherein the workflow model is stored in the database, and wherein the workflow model is generated from the one or more configurable templates;
   defining, by operation of the server, constraints associated with the one or more configurable step templates, wherein the constraints include:
      a phase-step constraint defining a placement within a phase for a step defined in the step template; and
      an attribute constraint defining that an attribute in the step template that has a user-defined value;
   validating, by operation of the server, the configurable step template of the workflow model by applying the defined constraints; and
   executing, by operation of the server, the one or more print jobs using the workflow model in the database and using the job information in the database,
   wherein the workflow model is a print model,
   wherein the configurable phase template defines one or more phases of printing the print job,
   wherein the configurable process template defines one or more processes of the one or more phases of printing the print job,
   wherein the configurable step template represents one or more steps in the one or more processes of printing the print job, and
   wherein the method further comprises:
      displaying, by operation of the server, a current status of the AFP print job using job information in the database, wherein the current status is indicated as a current phase for the AFP print job and a current step for the AFP print job,
   wherein each phase generated from a configurable phase template is a phase selected from a group consisting of: receive phase, prepare phase, enhance phase, print phase, insert phase, reconcile phase, and complete phase.

2. The computer implemented method of claim 1 wherein the step of executing further comprises:
  executing a first AFP print job using the workflow model in the database and using the job information in the database; and
  executing a second AFP print job using the workflow model in the database and using the job information in the database, wherein the first AFP print job and the second AFP print job are different jobs.

3. The computer implemented method of claim 2 wherein the step of generating further comprises:
  configuring one or more transitions between the one or more steps of the workflow model as entries in the database; and
  defining constraints associated with the one or more steps of the workflow model.

4. The computer implemented method of claim 3 wherein the step of executing further comprises:
  retrieving phase information from the database relating to the one or more phases and the one or more transitions from the database; and
  executing the retrieved one or more phases in accordance with the retrieved one or more transitions using the job information in the database.

5. The computer implemented method of claim 1 further comprising:
  presenting, by operation of the server, progress of execution of the generated workflow model to a user of the workflow processing system.

6. The computer implemented method of claim 1 further comprising:
  stopping, by operation of the server, further execution of the generated workflow process at an identified point in the execution thereof.

7. The computer implemented method of claim 6 wherein the generated workflow model includes one or more phases each comprising one or more steps, and wherein the step of stopping further comprises:
  stopping further execution of the generated workflow process at a transition from one phase to another phase.

8. The computer implemented method of claim 7 further comprising:
  resuming, by operation of the server, further execution of the generated workflow process.

9. The computer implemented method of claim 1 wherein the generated workflow model includes one or more phases each comprising one or more steps,
  wherein the workflow processing system includes a plurality of servers, each adapted to permit execution of one or more steps of one or more phases of one or more workflow models,
  wherein each of the one or more steps of the one or more phases includes load attribute information, and
  wherein the method further comprises:
  balancing a workload of the plurality of servers by using the load attribute information.

10. The computer implemented method of claim 9 wherein each of the plurality of servers includes a current workload level based on the load attribute of steps presently executing on said each server, and
  wherein the step of balancing further comprises:
  starting a next step of a phase of a workload model on a server of the plurality of servers having the lowest current workload level.

11. A system for workflow processing, the system comprising:
  a network storage system adapted to include a database for storing one or more workflow models and for storing job information relating to AFP print jobs to be processed in accordance with a corresponding workflow model; and
  a server coupled to the network storage system and adapted to display one or more configurable templates stored in the database, wherein each of the configurable templates comprises one of: a configurable phase template, a configurable process template, or a configurable step template, wherein each configurable phase template comprises one or more configurable process templates, and wherein each configurable process template comprises one or more step templates,
  wherein the server is further adapted to receive user input selecting one of the one or more configurable templates, is further adapted to receive user input to alter an attribute value and/or a parameter value of the selected configurable template to generate a new configurable template, and is further adapted to add the new configurable template in the database as one of the one or more configurable templates,
  wherein the server is further adapted to define constraints associated with the one or more configurable step templates, wherein the constraints include:
    a phase-step constraint defining a placement within a phase for a step defined in the step template; and
    an attribute constraint defining that an attribute in the step template that has a user-defined value,
  wherein the server is further adapted to validate the configurable step template of the workflow model by applying the defined constraints,
  wherein the server is further adapted to execute AFP print jobs using the job information in the database and the workflow model in the database, and is further adapted to generate and modify workflow models stored in the database,
  wherein the server is further adapted to generate the workflow models from the one or more configurable templates,
  wherein the workflow model is a print model,
  wherein the configurable phase template defines one or more phases of printing the print job,
  wherein the configurable process template defines one or more processes of the one or more phases of printing the print job,
  wherein the configurable step template represents one or more steps in the one or more processes of printing the print job, and
  wherein the method further comprises:
    displaying, by operation of the server, a current status of the AFP print job using job information in the database, wherein the current status is indicated as a current phase for the AFP print job and a current step for the AFP print job,
  wherein each phase generated from a configurable phase template is a phase selected from a group consisting of: receive phase, prepare phase, enhance phase, print phase, insert phase, reconcile phase, and complete phase.

12. The system of claim 11 wherein the server is designated as a primary server, and wherein the system further comprises:

one or more secondary servers each coupled to the network storage system and adapted to access the job information in the database and the workflow model in the database to execute AFP print jobs.

13. The system of claim 12
wherein the one or more secondary servers are coupled to the primary server and access the database indirectly through the primary server.

14. The system of claim 11 wherein the server is further adapted to execute a first AFP print job using the workflow model in the database and using the job information in the database, and further adapted to execute a second AFP print job using the workflow model in the database and using the job information in the database, wherein the first AFP print job and the second AFP print job are different jobs.

15. A computer implemented method for workflow processing, the method comprising:
displaying, by operation of a server, one or more configurable templates stored in the database, wherein each of the configurable templates comprises one of: a configurable phase template, a configurable process template, or a configurable step template, wherein each configurable phase template comprises one or more configurable process templates, and wherein each configurable process template comprises one or more configurable step templates;
receiving, by operation of the server, user input selecting one of the one or more configurable templates;
receiving, by operation of the server, user input to alter an attribute value and/or a parameter value of the selected configurable template to generate a new configurable template;
adding, by operation of the server, the new configurable template in the database as one of the one or more configurable templates;
configuring, by operation of a server, a workflow model based on the one or more configurable templates;
storing, by operation of the server, the configured workflow model in a database;
generating, by operation of the server, job information about AFP print job wherein the AFP print job is associated with the generated workflow model;
storing, by operation of the server, the job information in the database;
defining constraints associated with the one or more configurable step templates, wherein the constraints include:
a phase-step constraint defining a placement within a phase for a step defined in the step template; and
an attribute constraint defining that an attribute in the step template that has a user-defined value;
validating the configurable step template in the workflow model by applying the defined constraints; and
executing the AFP print job using the job information in the database and using the workflow model in the database, wherein the workflow model is a print model, wherein the configurable phase template defines one or more phases of printing the print job, wherein the configurable process template defines one or more processes of the one or more phases of printing the print job, wherein the configurable step template represents one or more steps in the one or more processes of printing the print job, and wherein the method further comprises:
displaying, by operation of the server, a current status of the AFP print job using job information in the database, wherein the current status is indicated as a current phase for the AFP print job and a current step for the AFP print job, wherein each phase generated from a configurable phase template is a phase selected from a group consisting of: receive phase, prepare phase, enhance phase, print phase, insert phase, reconcile phase, and complete phase.

16. The computer implemented method of claim 15 wherein the step of executing further comprises:
executing a first AFP print job using the workflow model in the database and using the job information in the database; and
executing a second AFP print job using the workflow model in the database and using the job information in the database, wherein the first print job and the second print job are different jobs.

17. The computer implemented method of claim 15 wherein the printing enterprise includes one or more AFP printers and one or more AFP print job sources, and wherein the method further comprises:
displaying, by operation of the server, current status of one or more AFP printers and of one or more print job sources.

18. The computer implemented method of claim 15 further comprising:
checkpointing, by operation of the server, the AFP print job at any point in execution thereof wherein the step of checkpointing includes:
saving, by operation of the server, modified job information in the database related to the checkpointed print job; and
saving, by operation of the server, modified data files used by the checkpointed AFP print job; and
restoring, by operation of the server, the checkpointed AFP print job to resume execution thereof wherein the step of restoring includes:
restoring, by operation of the server, the saved job information to the database; and
restoring, by operation of the server, the saved data files.

* * * * *

UNITED STATES PATENT AND TRADEMARK OFFICE
CERTIFICATE OF CORRECTION

PATENT NO.         : 8,284,423 B2
APPLICATION NO.    : 11/279052
DATED              : October 9, 2012
INVENTOR(S)        : Jahn et al.

Page 1 of 1

It is certified that error appears in the above-identified patent and that said Letters Patent is hereby corrected as shown below:

In column 16, line 3, the text "StepTemplate.MaximuinActiveUnit" should read
-- StepTemplate.MaximumActiveUnit --

In column 16, line 14, the text "StepTemplate.HigbResourceUsage" should read
-- StepTemplate.HighResourceUsage --

Signed and Sealed this
First Day of January, 2013

David J. Kappos
*Director of the United States Patent and Trademark Office*